UNITED STATES PATENT OFFICE.

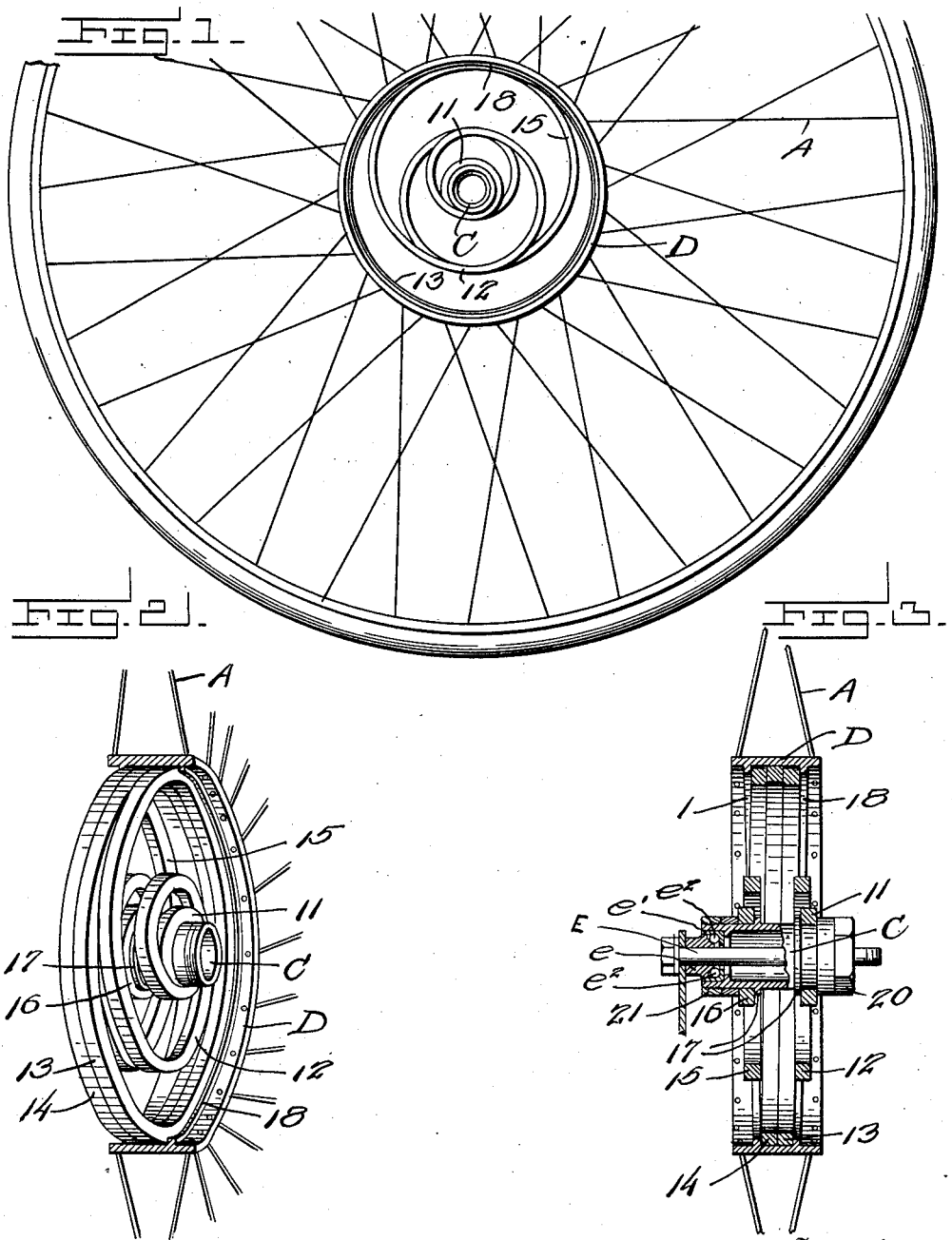

WILLIAM F. DOLL, OF NEW YORK, N. Y., ASSIGNOR OF ONE-HALF TO LEE McCLUNG, OF WASHINGTON, DISTRICT OF COLUMBIA.

RESILIENT WHEEL.

1,091,305. Specification of Letters Patent. Patented Mar. 24, 1914.

Original application filed December 27, 1912, Serial No. 738,860. Divided and this application filed December 12, 1913. Serial No. 806,213.

*To all whom it may concern:*

Be it known that I, WILLIAM F. DOLL, a citizen of the United States, residing in Manhattan borough, in the city and county of New York and State of New York, have invented new and useful Improvements in Resilient Wheels, of which the following is a specification.

This application is a division of my application for Letters Patent of the United States filed December 27, 1912, Serial Number 738,860.

The invention relates to certain improvements in wheels and the like, including, for example, automobile wheels, truck wheels, motor cycle wheels, bicycles wheels, wagon wheels, carriage wheels, gear wheels, pulleys, etc.: but it more particularly relates to spring hubs for such wheels.

The invention consists in certain peculiarities in the construction and arrangement of parts, and in certain novel combinations of elements, substantially as hereinafter described and particularly pointed out in the subjoined claims.

In the accompanying drawings, wherein like characters of reference denote similar parts in the several views: Figure 1 is a side elevation of a part of a wheel embodying the present improvements; Fig. 2 is a detail view, in perspective, of the hub of the wheel, showing the casing of the latter in section; and Fig. 3 is a vertical section of a spring hub embodying the present improvements.

The body or spoke portion A of the wheel herein shown is of the wire-spoke type, but this is not essential, being selected merely as being exemplary of a style of wheel in which my present spring-hub may be practically embodied. The present hub may, as is obvious, be embodied in wheels of many different types, including as further examples, those in which the spokes are made of wood, and those in which the spoke portions are formed of spirally-coiled members, examples of the last-named type being illustrated in my co-pending applications for Letters Patents numbered 738,858 and 738,859, both filed December 27, 1912, and in my Patents No. 1,048,813 and No. 1,053,976, of December 31, 1912 and February 25, 1913, respectively, both of which patents were pending concurrently with the application hereinbefore referred to of which the present case is a division.

When the body or spoke portion of the wheel are formed of a spring or springs, it is preferred that the spring of the hub portion shall be of different strength from that of the spring or springs of the body or spoke portion, whereby one will be elastic under loads which will not affect the other and the latter being in play when the limit of elasticity of the first is exceeded: the latter spring being preferably the spring of the hub. A spring wheel having its hub and spoke portions formed of springs of different strengths, as just described, is exemplified in my application No. 738,858, to which reference may be had for further understanding with respect thereto, it being understood however that the hub spring of the present case differs in the features now to be described, from the hub spring exemplified in the application referred to.

The hub spring of the present case is formed of a single piece of spring metal coiled as follows:—Starting at one end it is coiled, as shown at 11, to embrace a bearing sleeve, marked C, and thence spirally and with any suitable number of convolutions 12 in a direction which causes it gradually to approach a vertical plane which intersects the bearing sleeve C at a point substantially midway between the ends of the latter, and thence around to form two or more side-by-side circular convolutions 13 and 14, and thence, with any suitable number of spiral convolutions 15, in a direction which diverges from the vertical plane hereinbefore referred to, to said bearing sleeve, around which sleeve its end is coiled as shown at 16. The innermost coils 11 and 16 are spaced apart and embrace the sleeve C, as stated, and they are held in their spaced relation, preferably, by annular or other suitable projections 17 with which the bearing sleeve is provided. The convolutions 12 and 15 of the spring are reversely arranged and oppositely disposed, as shown. The outermost convolutions of the spring are embraced by a rim D which is provided with inward projections 18 for holding them against lateral displacement. This rim D also provides a means to which the wire spokes may be secured, as shown. Outward lateral displacement of the innermost convolutions of the spring upon the bearing sleeve C may be desirably prevented by means of nuts 20 and 21 threadably mounted upon said sleeve, as shown.

The hub may be provided with ball bearings, or other friction-reducing means and in Fig. 3 is shown as being mounted upon a shaft or axle E and as being provided with bearing members e and e' respectively having their confronting faces formed to provide a race for receiving the balls $e^2$, the outer member e of the bearing being preferably removable to give access to said balls. It will be understood that there are two sets of these ball-bearings, one at each side of the wheel.

Having now described the invention what I believe to be new and desire to secure by Letters Patent, is:—

1. In a resilient wheel or the like, a body or spoke portion, and a resilient hub mounted therein, said hub comprising an inner axial member, a continuously coiled spring having inner convolutions which are spaced apart and embrace said axial member, outer convolutions which lie side by side, and side convolutions between its outer and inner convolutions, said side convolutions being arranged reversely, the hub also having an outer rim disposed within the body portion of the wheel and around the outer convolutions of the spring member, said rim having means for maintaining the outer convolutions of the spring member against outward lateral displacement, and said axial member having means for maintaining the inner coils of the spring member in their predetermined spaced relation.

2. A resilient wheel or the like, having a body or spoke portion, and a resilient hub, said hub comprising a continuously coiled spring formed to provide oppositely disposed spirals which extend from the axis of the hub to the rim thereof, there being a plurality of convolutions at all points in the circumference, said convolutions of the circular portions lying closely together, side by side and said oppositely disposed spirals being inclined toward the circular convolutions, the ends of the spirals adjacent to the axis of the wheel being spaced from each other, means for maintaining their said spaced relation, a ring encircling the outer circular convolutions of the spirals and means for maintaining said circular convolutions against outward lateral displacement.

3. A resilient wheel or the like, consisting of an axial member having outward projections spaced from each other, a ring spaced from said axial member and having inward projections spaced from each other, spokes having their inner ends secured to said ring, a rim secured to the outer ends of the spokes, a continuously coiled spring member arranged between the axial member and ring, said spring member having oppositely disposed spirals whose convolutions extend from the axial member to the ring and thence around in circular form, there being a plurality of convolutions at all points in the circumference of the spring member, said convolutions of the circular portion lying closely together, side by side, and being held against lateral displacement between the inward projections of the ring, and said oppositely disposed spirals being inclined toward said ring, the ends of the spirals adjacent to the axial member being spaced from each other and held against inward lateral displacement by the outward projections of the axial member, and means removably applied to said axial member for holding the inner convolutions of the spirals against outward lateral displacement.

In testimony whereof I have hereunto set my hand in presence of two subscribing witnesses.

WILLIAM F. DOLL.

Witnesses:
 WM. PFEIFFER,
 HANNAH NEEDLEMAN.

---

Copies of this patent may be obtained for five cents each, by addressing the "Commissioner of Patents, Washington, D. C."